United States Patent
Oettle

(10) Patent No.: US 7,217,068 B2
(45) Date of Patent: May 15, 2007

(54) TOOL HOLDER FOR CUTTING BODIES

(75) Inventor: Matthias Oettle, Riederich (DE)

(73) Assignee: Hartmetall-Werkzeugfabrik Paul Horn GmbH, Tübingen (DE)

( * ) Notice: Subject to any disclaimer, the term of this patent is extended or adjusted under 35 U.S.C. 154(b) by 0 days.

(21) Appl. No.: 10/492,023

(22) PCT Filed: Aug. 21, 2002

(86) PCT No.: PCT/EP02/09327

§ 371 (c)(1),
(2), (4) Date: Apr. 8, 2004

(87) PCT Pub. No.: WO03/051563

PCT Pub. Date: Jun. 26, 2003

(65) Prior Publication Data

US 2004/0247404 A1 Dec. 9, 2004

(30) Foreign Application Priority Data

Oct. 31, 2001 (DE) .................. 101 53 646

(51) Int. Cl.
*B23B 29/04* (2006.01)
(52) U.S. Cl. ...................... 407/101; 407/110
(58) Field of Classification Search ................ 407/101, 407/106, 110, 109, 107, 111
See application file for complete search history.

(56) References Cited

U.S. PATENT DOCUMENTS 3,844,008 A 10/1974 Sletten
4,332,513 A * 6/1982 Gowanlock .................. 407/101
5,112,164 A 5/1992 Pano
5,288,180 A * 2/1994 Hedlund ...................... 407/101
5,688,080 A 11/1997 Hedlund
6,186,704 B1 2/2001 Hale

FOREIGN PATENT DOCUMENTS

DE 40 24 096 A1 2/1992
DE 195 17 365 A1 11/1996

* cited by examiner

*Primary Examiner*—Monica Carter
*Assistant Examiner*—Sara Addisu
(74) *Attorney, Agent, or Firm*—Roylance, Abrams, Berdo & Goodman, L.L.P.

(57) ABSTRACT

Tool holder for cutting bodies (5) may be mounted on a base holder (15) by a fixing device (41), and a cooperating stop extending in a plane in the direction of the tool holder. A positive positional fixing against any movement along the three axes of the spatial coordinate system may be obtained. The planar stop is divided into planar sections (19, 21) by a machined recess (23). The recess (23) forms a seat for housing a projecting matching body (25) on the base holder (15). The walls of the recess (23) form planar support surfaces (31, 33) for the matching body (25), which each define differing planes perpendicular to the stop, to resist displacement and torsional forces resulting from the cutting force into the matching body (25) of the base holder (15).

16 Claims, 2 Drawing Sheets

TOOL HOLDER FOR CUTTING BODIES

FIELD OF THE INVENTION

The present invention relates to a tool holder for cutting bodies, particularly indexable inserts. The tool holder may be mounted on a base holder by a fastening device. A bearing component operates in conjunction with and extends in a level configuration in the direction of the tool holder. The cutting forces generated by the cutting element are introduced into the base holder by the bearing component.

BACKGROUND OF THE INVENTION

DE 40 24 096 C2 discloses a tool holder having a cutting tool for metal cutting, a minicutter bar in particular. A cutting insert is braced by a clamping leg resting against it on a flat clamping surface in a recess having cutting insert mounting surfaces of a lengthwise slotted forked holder shaft. In the disclosed solution, the clamping surface of the cutting insert is positioned in parallel with the axis of the holder shaft. The recess in the holder shaft has three cutting insert bearing surfaces, specifically, a bottom surface, a main cutting pressure support surface, and a back pressure support surface which include angles smaller than 90° both relative to each other and to a side surface and a frontal surface as the only open side surfaces.

In use of such tool holders, it is extremely important for cutting of work pieces with respect to the accuracy to be achieved in the machining process and especially also to the quality of the surfaces machined for it to be possible to mount the tool holder with its bearing surface absolutely rigid and to secure on the base holder by means of the fastening device. In other words, it must be made certain that force components acting between tool holder and base holder as shearing forces or forces of torque, ones which try to twist the tool holder on the base holder, will be introduced safely, that is, without impairing the secure seating, into the base holder by way of the bearing surface.

DE 195 17 365A1 discloses a tool holder for machining by turning, comprising a base recess as tool holder which may be mounted with its tool axis oriented perpendicular to the axis of rotation on a tool carrier as base holder. A cutter holder is mounted to be replaceable on the base recess, and a cutting plate is mounted on the cutter holder so as to be replaceable. The base recess itself has a bearing surface as bearing component extending transversely to the tool axis. The cutter holder has a mounting surface and is detachably mountable with this surface on the bearing surface on the base recess. The cutter holder is immobilized against all relative movements of the mounting surface relative to the bearing surface by fitting elements, the cutter holder having at least one cutting insert seat.

Since, in this disclosed solution, the bearing component is not configured to be planar, but rather is designed with a gear cutting geometry, and the mating teeth of tool holder and base holder have frontal surfaces which are diametrically opposite each other, despite the fitting elements referred to above, especially ones in the form of set screws, tilting processes occur. The tilting results in an adverse effect on the accuracy of machining with the indexable inserts seated in the tool holder, since the latter also are also tilted and accordingly displaced in their machining plane. In addition, because of the gear cutting geometries, the disclosed solution results in increased production costs, in particular if the respective toothing is to be produced as high-precision toothing.

U.S. Pat. No. 5,688,080 discloses a generic tool holder for cutting elements, indexable inserts in particular. The tool holder may be mounted on a base holder by a fastening device with three fastening screws and a bearing component operating in conjunction with this base holder. A bearing component extends in a planar configuration in the direction of the tool holder. The cutting forces generated by the cutting element are introduced into the base holder by the bearing component, such bearing component being of planar configuration and being divided by a recess which is introduced into planar components. Between the planar components, the recess forms a seat to receive a projecting fitting element of the base holder. The walls of the recess for the fitting element form support surfaces which define, in relation to each other, different planes which, planar in configuration, extend transversely to the bearing component to introduce into the fitting element of the base holder both the shearing forces resulting from the cutting force and the torsional forces. In the solution, as disclosed, the recess is, with the exception of an area of opening on an edge in the tool holder, delimited on all sides by three walls. The walls define planes, all of which extend perpendicularly to the plane of the planar components. In particular, with respect to such planar components during fastening of the tool holder to the base holder, over determinations occur which are offset by a wedge which may be adjusted by means of a twin screw inside a recess in the fitting element designed to be longitudinally displaceable. A twin screw effects compensation for play between tool holder and base holder. If the bearing play in question is offset in the disclosed solution by the wedge, changes in position in the active cutting area of the cutting element result, preventing high-precision machining from being carried out with the disclosed solution. This disclosed solution is not cost-effect in production in view of the great variety of components.

SUMMARY OF THE INVENTION

Objects of the present invention are to provide an improved tool holder for cutting elements so that the bearing component is configured to have an especially reliable mounting on the base holder and to have high-precision machining, and production of the tool holder is nevertheless cost effective.

The objects of the present invention are basically provided by the recess being configured as a channel. Its walls delimit the recess and define planes, each of which extends perpendicularly to the plane of the planar components. The two planar components are separated from each other by the recess, and extend in a common plane or in different planes positioned so as to be in parallel with each other. A positive locking in position is obtained against any movement along the three axes of the three-dimensional coordinates. This positive locking in three different planes, which preferably extend perpendicularly to each other, is obtained without the need for provision of undercut surfaces on the bearing component of the tool holder or on the fitting element of the base holder. Thus, mounting of the tool holder may be effected by simple insertion of the fitting element into the recess in the course of a rectilinear insertion movement, making use of the tool holder simple and comfortable. In addition, the respective configuration may be accomplished cost-effectively by use of flat bearing and fitting surfaces. In connection with the plane of contact with the seat of the base holder formed by the planar components, which plane of contact in turn is perpendicular to the planes of contact on the support surfaces, there is thus obtained a positive locking, free of play, against movements of translation and rotation relative to all three dimensional coordinate axes. In this regard, additional means of compensation for elimination of play, such as the longitudinally adjustable wedge disclosed in U.S. Pat. No. 5,688,080, may be dispensed with in the present invention.

If the tool holder is provided for use with a base holder forming a beam-like base holder, by preference it is to be possible to mount the tool holder on the latter in such a way that the plane of the bearing component extends in parallel with the primary longitudinal axis of the base holder. In this configuration, positive locking of base holder and bearing component prevents torsion about the longitudinal axis of the base holder. In conjunction with the support surfaces formed on the walls of the recess, other potential movements within the three-dimensional system of coordinates are eliminated by positive locking.

Preferably, the tool holder is in the form of a clamping holder having a clamping jaw integral with a base element. The clamping jaw is mounted on the base element so as to protrude. The clear span can be varied by an attachment screw extending through the cutting element for the purpose of clamping this element rigidly in position.

Preferably, clamp bolts, which extend through the tool holder in the direction perpendicular to the plane of the bearing surface, are provided as fastening devices for mounting of the tool holder on the base holder.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
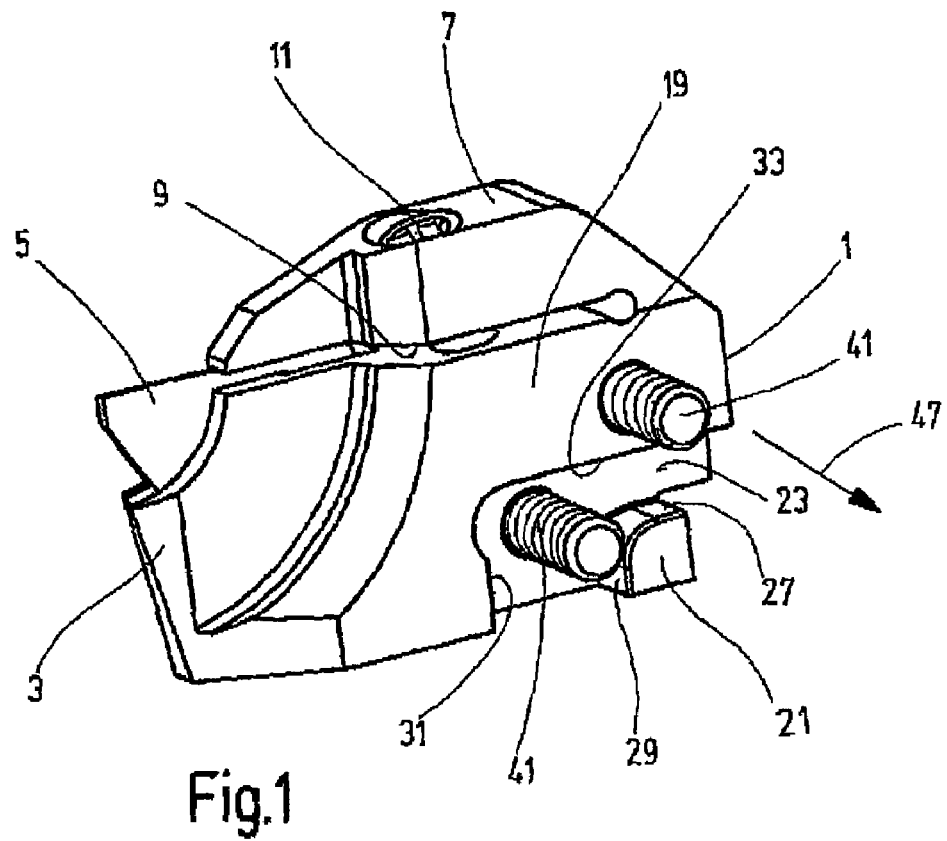
FIG. 1 is a perspective view of a tool holder according to an embodiment of the present invention, as seen in the direction of its bearing component for mounting on a base holder.

A tool holder according to an embodiment of the present invention is described on the basis of as a holder represented by a clamping holder. The holder has a base component 1 which has in the area of its front end a seating adapter 3 with a seat as receptacle for a commercially available indexable insert 5. A clamping jaw 7, integral with the base component 1, is mounted on this base component 1 and projects forming a clamp opening 9. The clear span of the clamp opening may be reduced by an attachment screw 11 extending through the clamp opening to immobilize the indexable insert 5 in its seat in the seating adapter 3 by pressing the clamping jaw 7 against this indexable insert 5.

Figure 2:
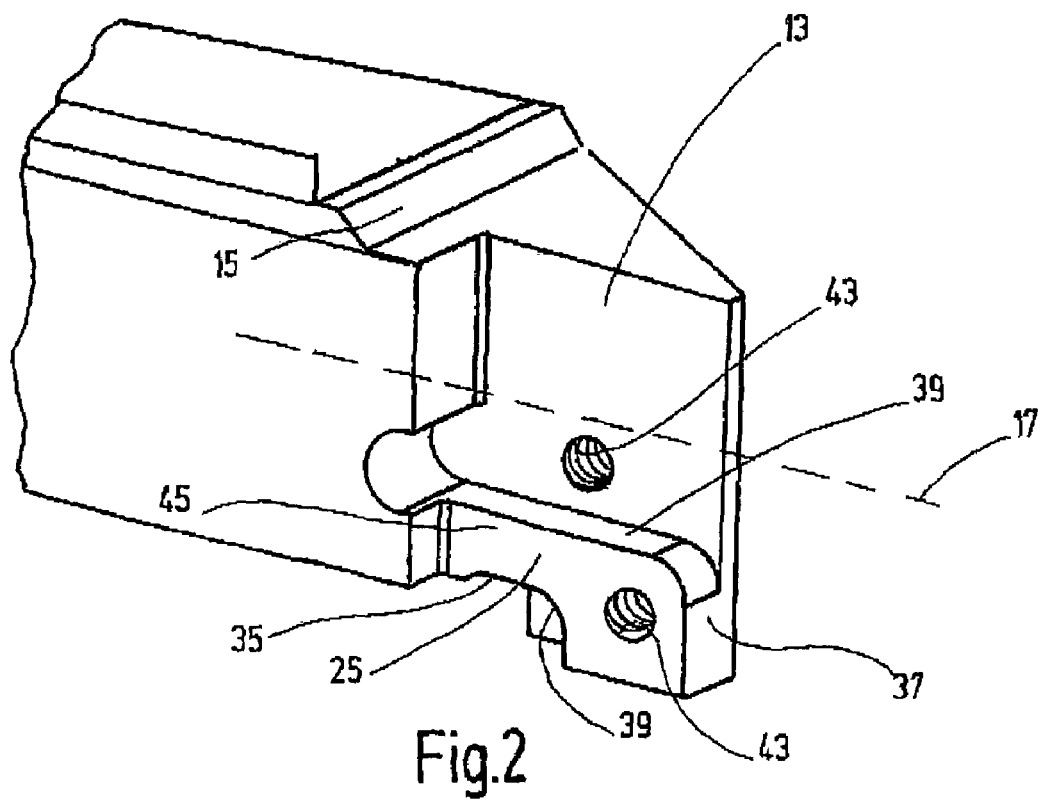
FIG. 2 is a partial perspective view of the front part of a base holder designed for seating the tool holder of FIG. 1.
Figure 3:
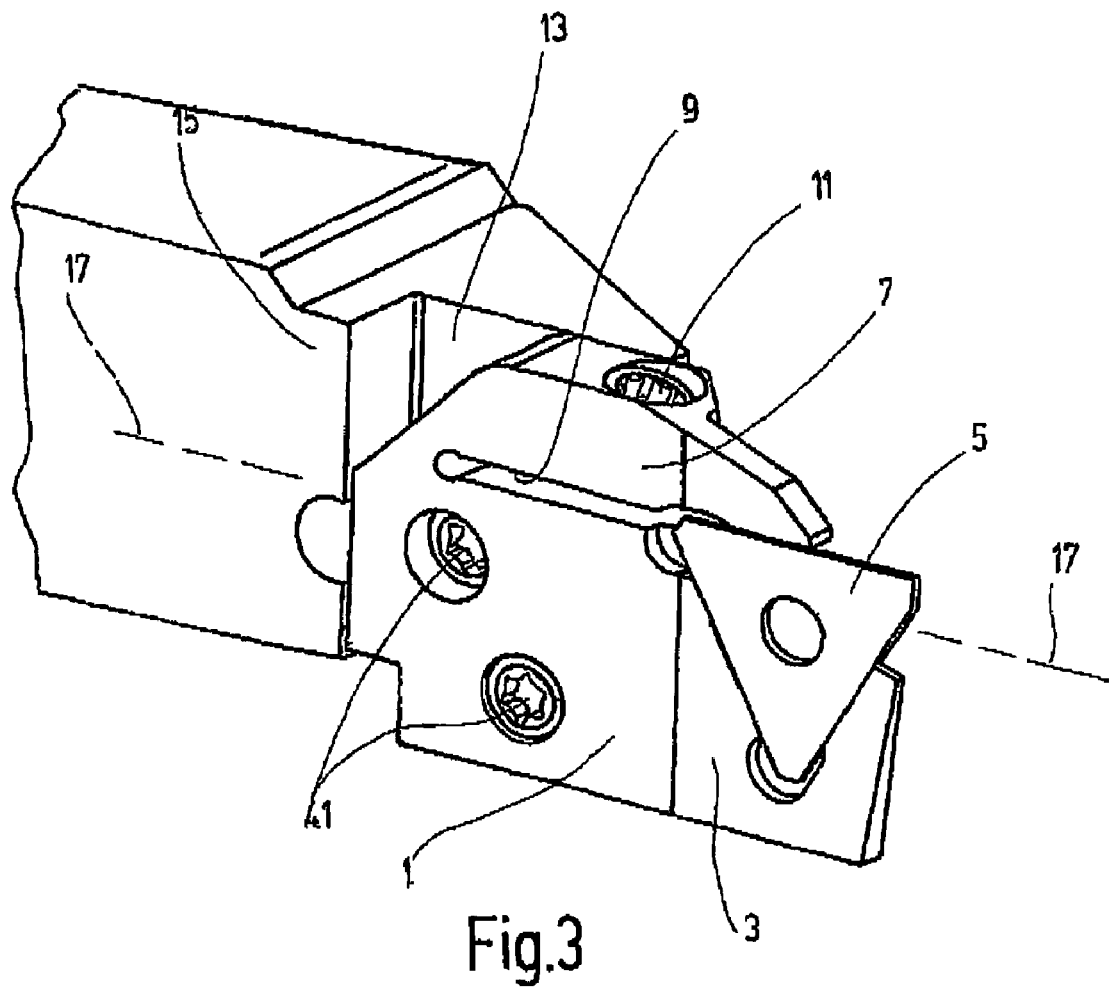
FIG. 3 is a partial perspective view of the tool holder of FIG. 1 mounted on the base holder.
Figure 4:
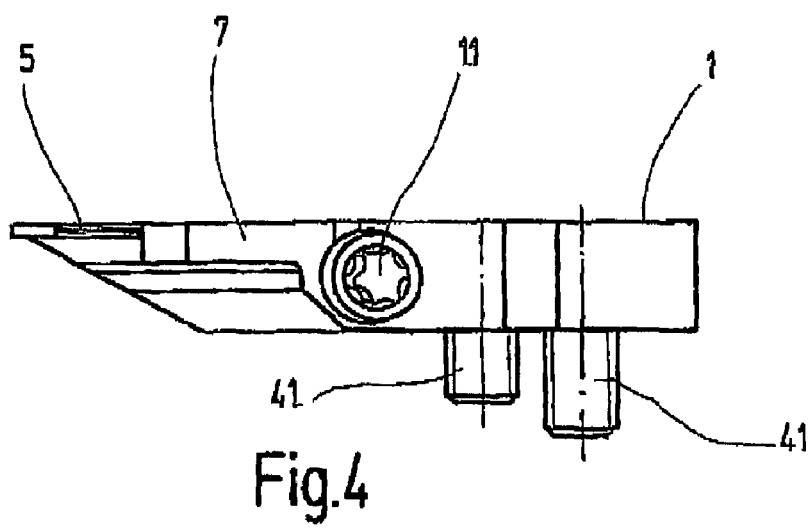
FIG. 4 is a top plan view of the tool holder of FIG. 1.

As is to be seen in the figures (see FIG. 3 in particular), the opposite wider side of the base component 1 may be mounted on a tool seat 13 of a base holder 15. Only the front end area of the base holder with the tool seat 13 is shown in FIGS. 2 and 3. In the part not shown, the base holder 15 is in the form of a beam-like support with a primary or longitudinal support axis 17.

For the purpose of operation in conjunction with the tool seat 13 of the base holder 15, a bearing component is on the associated wider side of the base element 1 of the tool holder. The bearing component has a bearing component, a bearing surface which, as is clearly to be seen in FIG. 1, is divided into two planar components 19 and 21. The two planar components 19 and 21, which together form the bearing component and accordingly the bearing surface, are situated in one common plane. The planar components 19 and 21 are separated by a channel-like recess 23 in the bearing surface. Tool seat 13 is on the base holder 15 (see FIG. 2). A fitting element 25, in the form of a projection having a shape adapted to that of the recess 23 in the base component 1 of the tool holder, may be seated in the recess. The walls 27, 29, 31, and 33 of the recess 23, which adjoin both the planar component 19 and the planar component 21, each extend perpendicularly to the plane of the bearing surface comprising the planar components 19 and 21. The walls of the recess 23, which in FIG. 1 are identified as 31 and 33, form planar support surfaces for positive locking of the tool holder when the latter is mounted on the seat 13 of the base holder 15 so that the fitting element 25 is seated in the recess 23. In this process, the wall 31 adjoining the planar component 19 forms a support surface which is adjacent to the front part 37 of the fitting element 25 in FIG. 2, while the wall 33 serves as support surface in conjunction with the upper side 39 in FIG. 2, of the fitting element 25.

In the case of the fitting element 25 seated in the recess 23, positive locking is provided adjacent surfaces extending in several planes which are not parallel to each other on the support surfaces. The support surfaces are formed by the planar component 19. Walls 31 and 33 adjoin the bearing surface of the recess 23. In connection with the plane of contact with the seat 13 of the base holder formed by the planar components 19 and 21, the plane of contact in turn is parallel to the planes of contact on the support surfaces. Thus, a positive locking is obtained against movements of translation and rotation relative to all three dimensional coordinate axes.

In the exemplary embodiment illustrated, two clamp bolts 41 are provided for fastening the tool holder on the base holder 15. Clamp bolts 41 extend through bores in the base component 1 of the tool holder. Each bolt may be screwed into a bore 43 having internal threading on the seat 13 of the base holder 15. As is to be seen in the figures, one of the clamp bolts 41 extends through the planar surface 19 of the bearing surface of the tool holder, while the other clamp bolt 41 extends inside the recess 23. This other clamp bolt 41 on the base holder 15 operates in conjunction with a threaded bore 43 formed in the fitting element 25.

Since the walls 27, 29, 31, and 33 extend perpendicularly to the plane of the bearing surface of the planar components 19 and 21, the walls of the recess 23 have no undercut. The fitting element 25 may then be introduced into the recess 23 with a rectilinear direction of movement when the tool holder is mounted on the base holder 15.

In the example illustrated, the recess 23 is more or less in the form of a channel, so that the fitting element 25 has a section 45 in FIG. 2 which extends parallel to the longitudinal axis 17 of the base holder 15. When the tool holder is mounted on the seat 13, a force component acts in the direction of the arrow 47 in FIG. 1 as a result of tightening of the clamp bolts 41, and as a result, tries to displace the longitudinal section 45 of the fitting element 25 along the wall of the recess 23 in order to force the support surface on the wall 31 free of clearance against the part 37 of the fitting element 25. The through bores through which the bolts 41 extend in the base component 1 are displaced minimally relative to the threaded bores 43 on the base holder 15. When the bolts 41 are tightened, a force component is generated which acts in a direction indicated by the arrow 47 in FIG. 1. The force component acting in this direction also forces the support surface formed on the wall 33 of the planar component against the upper side 39 (FIG. 2) of the fitting element 25 so that there is no clearance.

In place of the bearing surface extending in one plane as bearing component, this bearing surface may also be configured to be stepped. Thus, the planar components 19 and 21 can extend in different planes situated parallel to each other.

While an embodiment has been chosen to illustrate the invention, it will be understood by those skilled in the art that various changes and modifications can be made therein without departing from the scope of the invention as defined in the appended claims.

What is claimed is:

1. A tool holder for cutting bodies mountable on a base holder by a clamping device, the tool holder comprising:
a bearing component extending in a tool holder direction and cooperating with the base holder for receiving cutting forces through said bearing component, said bearing component having a recess completely dividing and separating said bearing component into separated first and second planar components and forming a seat to receive a projecting fitting element on the base holder, said recess being defined by walls with planar support surfaces thereon extending in different planes relative to one another and extending transversely to said planar components for transmission of shearing and torsional forces resulting from cutting forces into the fitting element, said recess being configured as a channel with two of said support surfaces forming a side of said recess and extending in non-parallel planes perpendicular to said first and second planar components, said first and second planar components and with two opposite longitudinal ends opening to an external environment extending in one of a common plane and in two different planes parallel to one another.

2. A tool holder according to claim 1 wherein
a base holder is coupled to said bearing component, said base holder having a beam support with a primary longitudinal axis, a plane of said planar components extending parallel to said primary longitudinal axis.

3. A tool holder according to claim 2 wherein
a first one of said support surfaces extends in a plane perpendicular to said primary longitudinal axis and transmits to the fitting element of the base holder shearing forces resulting from cutting forces acting in a direction of said primary longitudinal axis.

4. A tool holder according to claim 3 wherein
a second one of said support surfaces adjoins the same planar component as said first one of said support surfaces, and extends in a plane perpendicular to said first one of said support surfaces for transmitting torsional cutting forces to the fitting element of the base holder.

5. A tool holder according to claim 1 further comprises
a clamping holder having a clamping jaw integral with a base component, said clamping jaw forming a clamp opening in said base component; and
an attachment screw extending through said clamp opening for varying a clear span of said clamp opening and for securing a cutting element therein by reducing the clear span.

6. A tool holder according to claim 1 wherein
first and second clamp bolts extend through said bearing component perpendicular to said planar components for mounting the tool holder on the base holder.

7. A tool holder according to claim 6 wherein
said first clamping bolt extends through one of said planar components; and
said second clamping bolt extends through said recess.

8. A tool holder assembly, comprising:
a base holder having a projecting fitting element, a tool seat and first and second parallel base holder bores;
first and second clamping bolts extending through said first and second base holder bores, respectively; and
a tool holder coupled in said tool seat by said clamping bolts and having a bearing component extending in a tool holder direction and cooperating with said base holder for receiving cutting forces through said bearing component, said bearing component having first and second parallel tool holder bores receiving said first and second clamping bolts, respectively, and having a recess dividing and separating said bearing component into first and second planar components and forming a seat to receive said projecting fitting element on said base holder, said recess being defined by walls with planar support surfaces thereon extending in different planes relative to one another and extending transversely to said planar components for transmission of shearing and torsional forces resulting from cutting forces into said fitting element, said recess being configured as a channel with two of said support surfaces forming a side of said recess and extending in non-parallel planes perpendicular to said first and second planar components, said first and second planar components extending in one of a common plane and in two different planes parallel to one another, said first and second base holder bores being laterally spaced by a base distance, said first and second tool holder bores being laterally spaced by a tool distance, said base distance and said tool distance being unequal such that the base holder bores and the tool holder bores are minimally displaced relative to one another.

9. A tool holder assembly according to claim 8 wherein
said base holder has a beam support with a primary longitudinal axis, a plane of said planar components extending parallel to said primary longitudinal axis.

10. A tool holder assembly according to claim 9 wherein
a first one of said support surfaces extends in a plane perpendicular to said primary longitudinal axis and transmits to said fitting element of said base holder searing forces resulting from cutting forces acting in a direction of said primary longitudinal axis.

11. A tool holder assembly according to claim 10 wherein
a second one of said support surfaces adjoins the same planar component as said first one of said support surfaces, and extends in a plane perpendicular to said first one of said support surfaces for transmitting torsional cutting forces to said fitting element of said base holder.

12. A tool holder assembly according to claim 8 wherein
said tool holder comprises a clamping holder having a clamping jaw integral with a base component, said clamping jaw forming a clamp opening in said base component; and an attachment screw extends through said clamp opening for varying a clear span of said clamp opening and for securing a cutting element therein by reducing the clear span.

13. A tool holder assembly according to claim 8 wherein said first and second clamping bolts extending through said bearing component perpendicular to said planar components.

14. A tool holder assembly according to claim 13 wherein said first clamping bolt extends through one of said planar components; and said second clamping bolt extends through said recess.

15. A tool holder assembly according to claim 8 wherein said base holder bores are internally threaded.

16. A tool holder assembly according to claim 8 wherein said channel completely divides and separates said first and second planar components, and comprises two opposite longitudinal ends opening to an external environment.

* * * * *